United States Patent
Law et al.

[11] Patent Number: 5,849,399
[45] Date of Patent: Dec. 15, 1998

[54] BIAS TRANSFER MEMBERS WITH FLUORINATED CARBON FILLED FLUOROELASTOMER OUTER LAYER

[75] Inventors: Kock-Yee Law; Joseph Mammino, both of Penfield; Gerald M. Fletcher, Pittsford; Martin A. Abkowitz, Webster; Ihor W. Tarnawskyj, Webster; Kathleen M. McGrane, Webster, all of N.Y.

[73] Assignee: Xerox Corporation, Stamford, Conn.

[21] Appl. No.: 635,356

[22] Filed: Apr. 19, 1996

[51] Int. Cl.$^6$ ............................ B32B 15/06; B32B 24/04; B32B 25/14; B32B 25/20
[52] U.S. Cl. ........................... 428/212; 428/323; 428/421; 428/422; 428/425.8; 428/450; 428/462; 492/49; 492/53; 492/56; 492/59; 430/126
[58] Field of Search ...................................... 428/323, 328, 428/421, 428, 447, 450, 457, 462, 212, 425.8; 492/49, 53, 54, 56, 59; 430/126

[56] References Cited

U.S. PATENT DOCUMENTS

| | | | |
|---|---|---|---|
| 2,786,874 | 3/1957 | Teeters et al. | 260/653 |
| 2,807,233 | 9/1957 | Fitch | 118/637 |
| 3,043,684 | 7/1962 | Mayer | 96/1 |
| 3,267,840 | 8/1966 | Honma et al. | 101/1 |
| 3,328,193 | 6/1967 | Oliphant et al. | 117/37 |
| 3,525,146 | 8/1970 | Hayashida et al. | 29/589 |
| 3,598,580 | 8/1971 | Baltazzi et al. | 96/1.4 |
| 3,630,591 | 12/1971 | Eastman | 355/3 |
| 3,684,364 | 8/1972 | Schmidlin | 355/3 |
| 3,691,992 | 9/1972 | Beemer | 118/107 |
| 3,702,482 | 11/1972 | Dolcimascolo et al. | 346/74 ES |
| 3,782,205 | 1/1974 | Fletcher et al. | 73/497 |
| 3,832,055 | 8/1974 | Hamaker | 355/3 R |
| 3,847,478 | 11/1974 | Young | 355/3 |
| 3,872,032 | 3/1975 | Kanemaru et al. | 260/2 H |
| 3,925,492 | 12/1975 | Ukaji et al. | 260/653.9 |
| 3,959,573 | 5/1976 | Eddy et al. | 428/425 |
| 3,959,574 | 5/1976 | Seanor et al. | 428/425 |
| 4,118,235 | 10/1978 | Horiuchi et al. | 106/38.22 |
| 4,247,608 | 1/1981 | Watanabe et al. | 429/194 |
| 4,257,699 | 3/1981 | Lentz | 355/3 FU |
| 4,308,063 | 12/1981 | Horiuchi et al. | 106/38.22 |
| 4,348,363 | 9/1982 | Akiyama et al. | 422/192 |
| 4,427,803 | 1/1984 | Fukui et al. | 523/402 |
| 4,447,663 | 5/1984 | Akiyama et al. | 570/150 |
| 4,522,907 | 6/1985 | Mitsuhashi et al. | 430/102 |
| 4,524,119 | 6/1985 | Luly et al. | 430/108 |
| 4,840,675 | 6/1989 | Fukui et al. | 106/38.22 |
| 5,000,875 | 3/1991 | Kolouch et al. | 252/511 |
| 5,017,432 | 5/1991 | Eddy et al. | 428/422 |
| 5,035,950 | 7/1991 | Del Rosario | 428/421 |
| 5,061,965 | 10/1991 | Ferguson et al. | 355/284 |

(List continued on next page.)

FOREIGN PATENT DOCUMENTS

| | | |
|---|---|---|
| 0 606 907 A1 | 1/1994 | European Pat. Off. . |
| 05107874 A | 4/1993 | Japan . |
| 94301850 | 6/1994 | Japan . |
| 6-301850 | 12/1994 | Japan . |
| 7160138-A | 6/1995 | Japan . |
| 8-15960A | 1/1996 | Japan . |

OTHER PUBLICATIONS

Fluorochemical Products of Daikin Industries, Dakin Industries, Ltd., Feb., 1994.

"Fluoropolymers and Fluoroelastomers" Yanabe et al., pp. 429–431, 1997, Macromolecular Design of Polymeric Materials, Marcel Dekker, Inc.

*Primary Examiner*—Vivian Chen
*Attorney, Agent, or Firm*—Annette L. Bade

[57] ABSTRACT

A biasable transfer system member for use in an electrographic printing apparatus for attracting electrically charged particles from an imaging substrate to the biasable transfer system member includes an electrically conductive core and an outer layer of a fluorinated carbon filled elastomer wherein the fluorinated carbon has a fluorine content of about 10 to about 30 weight percent based on the weight of fluorinated carbon.

27 Claims, 1 Drawing Sheet

U.S. PATENT DOCUMENTS

| | | | |
|---|---|---|---|
| 5,132,743 | 7/1992 | Bujese et al. | 355/274 |
| 5,166,031 | 11/1992 | Badesha et al. | 430/124 |
| 5,177,538 | 1/1993 | Mammino et al. | 355/259 |
| 5,208,638 | 5/1993 | Bujese et al. | 355/274 |
| 5,217,837 | 6/1993 | Henry et al. | 430/124 |
| 5,259,990 | 11/1993 | Schlueter, Jr. et al. | 252/500 |
| 5,281,506 | 1/1994 | Badesha et al. | 430/124 |
| 5,286,566 | 2/1994 | Schlueter, Jr. et al. | 428/413 |
| 5,286,570 | 2/1994 | Schlueter et al. | 428/423.1 |
| 5,303,014 | 4/1994 | Yu et al. | 355/273 |
| 5,366,772 | 11/1994 | Badesha et al. | 428/35.8 |
| 5,370,931 | 12/1994 | Fratangelo et al. | 428/334 |
| 5,378,526 | 1/1995 | Murata | 128/214 |
| 5,450,184 | 9/1995 | Yanai et al. | 355/299 |
| 5,547,797 | 8/1996 | Anno et al. | 430/106.6 |
| 5,587,110 | 12/1996 | Yamana et al. | 252/511 |

BIAS TRANSFER MEMBERS WITH FLUORINATED CARBON FILLED FLUOROELASTOMER OUTER LAYER

CROSS REFERENCE TO RELATED APPLICATIONS

Attention is directed to the following copending applications assigned to the assignee of the present application: U.S. application Ser. No. 08/672,803 filed Jun. 28, 1996, entitled, "Biasable Charging Members with Fluorinated Carbon Filled Fluoroelastomer Outer Layer;" U.S. application Ser. No. 08/706,387 filed Aug. 30, 1996, entitled, "Instant On Fuser System Members;" U.S. application Ser. No. 08/779,287 filed Jan. 21, 1997 U.S. Pat. No. 5,761,595, entitled, "Intermediate Transfer Members;" U.S. application Ser. No. 08/706,057 filed Aug. 30, 1996 U.S. Pat. No. 5,765,085, entitled, "Fixing Apparatus and Film;" and U.S. application Ser. No. 08/786,614 filed Jan. 21, 1997, entitled, "Ohmic Contact-Providing Compositions." The disclosures of the patents are hereby incorporated by reference in their entirety.

BACKGROUND OF THE INVENTION

The present invention relates to elastomer layers and a process for forming the elastomer layers, and more specifically, to fluorinated carbon filled elastomers useful as layers for electrostatographic members, especially xerographic members such as bias transfer members, and methods thereof. In embodiments, there are selected fluorinated carbon filled elastomers which are useful as layers for components in electrostatographic processes, especially xerographic processes, including biasable rolls, belts and other members, for example, bias charging belts, films and rolls; bias transfer belts, films and rolls; bias development belts, films and rolls; bias inductive belts, films and rolls; and the like. In embodiments, the present invention allows for the preparation and manufacture of biasable members with superior electrical and mechanical properties, including controlled conductivity in a desired resistivity range, and increased mechanical strength, durometer, tensile strength, elongation and toughness. Further, in embodiments, the layers also exhibit excellent properties such as statistical insensitivity of conductivity to changes in temperature and humidity, intense continuous corona exposure, corrosive environments, solvent treatment, running time or cycling to high electric fields and back. Also, in embodiments, the layers permit a decrease in contamination of other xerographic components such as photoconductors.

Generally, the process of electrostatographic copying is initiated by exposing a light image of an original document onto a substantially uniformly charged photoreceptive member. Exposing the charged photoreceptive member to a light image discharges a photoconductive surface thereon in areas corresponding to non-image areas in the original document while maintaining the charge in image areas, thereby creating an electrostatic latent image of the original document on the photoreceptive member. This latent image is subsequently developed into a visible image by depositing charged developing material such as toner onto the photoreceptive member such that the developing material is attracted to the charged image areas on the photoconductive surface. Thereafter, the developing material, and more specifically toner, is transferred from the photoreceptive member to a copy sheet or to some other image support substrate to create an image which may be permanently affixed to the image support substrate, thereby providing an electrophotographic reproduction of the original document. In a final step in the process, the photoconductive surface of the photoreceptive member is cleaned to remove any residual developing material which may be remaining on the surface thereof in preparation for successive imaging cycles.

The process of transferring toner materials via a bias roll transfer system in an electrostatographic apparatus involves the physical detachment and transfer over of charged particulate toner material from a first image support surface (i.e., a photoreceptor) into attachment with a second image support substrate (i.e., a copy sheet) under the influence of electrostatic force fields generated by an electrically biased roll member and charge being deposited on the second image support substrate by, for example, a bias transfer roll or by spraying the charge on the back of the substrate. The bias transfer rollers are configured so as to include an inner conductive member having at least one layer of high electrical resistance material, for transferring a toner powder image from the photoreceptor onto a print receiving web, for charging the back side of a substrate, or charging the photoreceptor prior to the exposure of the original document to form an electrostatic latent image on the photoreceptor. Thus, roll members to which the present invention pertains have various uses in the electrostatographic process.

The electrostatographic copying process described herein is well known and is commonly used for light lens copying of an original document. Analogous processes also exist in other electrostatographic printing applications such as, for example, digital laser printing where a latent image is formed on the photoconductive surface via a modulated laser beam, or ionographic printing and reproduction where charge is deposited on a charge retentive surface in response to electronically generated or stored images.

Toner transfer has also been accomplished successfully via biased roll transfer systems. This type of transfer apparatus is described by Fitch in U.S. Pat. No. 2,807,233, the disclosure of which is hereby incorporated by reference in its entirety, which discloses the use of a metal roll coated with a resilient coating having an approximate resistivity of at least $10^6$ ohm/cm, that provides a means for controlling the magnetic and non-magnetic forces acting on the toner particles during the transfer process. Bias roll transfer has become the transfer method of choice in a number of xerographic copying systems and apparatus, as can be found, for example, in the Model 9000 Series of machines manufactured by Xerox Corporation. Notable examples of bias roll transfer systems are described in U.S. Pat. No. 3,702,482 by C. Dolcimacsolo et al, and U.S. Pat. No. 3,782,205, issued to T. Meagher, the disclosures of which are hereby incorporated by reference in their entirety. Other general examples of bias roll transfer systems can be found in U.S. Pat. Nos. 3,043,684; 3,267,840; 3,328,193; 3,598,580; 3,525,146; 3,630,591; 3,684,364; 3,691,992; 3,832,055; and 3,847,478, among others. The disclosures of the listed patents are herein incorporated by reference in their entirety.

An important aspect of the transfer process focuses on maintaining the same pattern and intensity of electrostatic fields as on the original latent electrostatic image being reproduced to induce transfer without causing scattering or smearing of the developer material. This important and difficult criterion is satisfied by careful control of the electrostatic fields, which, by necessity, should be high enough to effect toner transfer while being low enough to not cause arcing or excessive ionization at undesired locations. These electrical disturbances can create copy or print defects by inhibiting toner transfer or by inducing uncontrolled transfer which can easily cause scattering or smearing of the development materials.

The problems associated with successful image transfer are known. In the pretransfer air gap region, or the so-called prenip region immediately in advance of copy sheet contact with the image, excessively high transfer fields can result in premature toner transfer across the air gap, leading to decreased resolution or blurred images. High transfer fields in the prenip air gap can also cause ionization, which may lead to loss of transfer efficiency, strobing or other image defects, and a lower latitude of system operating parameters. Conversely, in the post transfer air gap region or the so-called postnip region at the photoconductor-copy sheet separation area, insufficient transfer fields can give rise to image dropout and may generate hollow characters. Improper ionization in the postnip region may also create image stability defects and can give rise to copy sheet separation problems. One overriding consideration in providing an effective transfer system that focuses on the transfer field generated in the transfer region which must be maximized in the area directly adjacent the transfer nip where the copy paper contacts the image so that high transfer efficiency and stable transfer can be achieved.

Attempts at maintaining an acceptable transfer field have focused on controlling the resistivity range at the pre and post nip areas. These attempts have included adding ionic additives to the elastomer layers of the bias transfer rolls in an attempt to control the resistivity at the pre and post nip areas. U.S. Pat. Nos. 3,959,573 and 3,959,574 both to Seanor et al. describe adding additives such as a quaternary ammonium compound to hydrophobic and hydrophilic elastomeric polyurethane layers, respectively, in order to control the changes in resistivity due to changes in relative humidity.

Similarly, U.S. Pat. Nos. 5,286,570, 2,259,990, 2,586,566 and 2,259,989, all to Schlueter, Jr. et al, describe the addition of an asymmetric ionic quarternary ammonium salt to a polyurethane elastomer to extend the useful electrical life of the polyurethane elastomers.

While addition of ionic additives to elastomers may partially control the resistivity of the elastomers to some extent, there are problems associated with the use of ionic additives. In particular, undissolved particles frequently appear in the elastomer which causes an imperfection in the elastomer. This leads to a nonuniform resistivity, which in turn, leads to poor transfer properties and poor mechanical strength. Furthermore, bubbles appear in the conductive elastomer, some of which can only be seen with the aid of a microscope, others of which are large enough to be observed with the naked eye. These bubbles provide the same kind of difficulty as the undissolved particles in the elastomer namely, poor or nonuniform electrical properties, poor mechanical properties such as durometer, tensile strength, elongation, a decrease in the modulus and a decrease in the toughness of the material.

In addition, the ionic additives themselves are sensitive to changes in temperature, humidity, operating time and applied field. These sensitivities often limit the resistivity range. For example, the resistivity usually decreases by up to two orders of magnitude or more as the humidity increases from 20% to 80% relative humidity. This effect limits the operational or process latitude.

Moreover, ion transfer can also occur in these systems. The transfer of ions will lead to contamination problems, which in turn, can reduce the life of the machine. Ion transfer also increases the resistivity of the elastomer member after repetitive use. This can limit the process and operational latitude and eventually, the ion-filled elastomer component will be unusable.

Conductive particulate fillers, such as carbons, have also been used in an attempt to control the resistivity. U.S. Pat. No. 5,000,875 to Kolouch discloses tetrafluoroethylene copolymer compositions containing conductive carbon black or graphite fibers to increase conductivity when the tetrafluoroethylene copolymer has been treated with a fluorinating agent.

Generally, carbon additives control the resistivities and provide stable resistivities upon changes in temperature, relative humidity, running time, and leaching out of contamination to photoconductors. However, the required tolerance in the filler loading to achieve the required range of resistivity has been extremely narrow. This along with the large "batch to batch" variation leads to the need for extremely tight resistivity control. In addition, carbon filled elastomer surfaces have typically had very poor dielectric strength and sometimes significant resistivity dependence on applied fields. This leads to a compromise in the choice of centerline resistivity due to the variability in the electrical properties, which in turn, ultimately leads to a compromise in performance.

Therefore, there exists a specific need for an elastomer outer surface for bias system members which allows for a stable conductivity in the desired resistivity range without the problems associated with ionic additives and carbon additives.

SUMMARY OF THE INVENTION

Examples of objects of the present invention include:

It is an object of the present invention to provide bias system members and methods thereof with many of the advantages indicated herein.

Further, it is an object of the present invention to provide bias system members and methods thereof which have more uniform electrical properties including resistivity.

Another object of the present invention is to provide bias system members and methods thereof which enable control of electrical properties including the control of conductivity in the desired resistivity range.

It is a further object of the present invention to provide bias system members and methods thereof which have more stable mechanical properties such as mechanical strength, durometer, tensile strength, elongation and toughness.

Yet another object of the present invention is to provide bias system members and methods thereof which have decreased sensitivities to changes in temperature, relative humidity, corona exposure, corrosive environments, solvent treatment, cycling to high electric fields, and running time.

Still another object of the present invention is to provide bias system members and methods thereof which decrease contamination of other xerographic components such as photoconductors.

It is still yet another object of the present invention to provide bias system members and methods thereof which improve evenness of the coating.

Many of the above objects have been met by the present invention, in embodiments, which includes: a biasable transfer member comprising:
a) an electrically conductive core; and b) an outer layer provided on said electrically conductive core comprising a fluorinated carbon filled fluoroelastomer.

Embodiments further include: a biasable transfer member for use in an electrographic printing apparatus for transferring electrically charged particles from an image support surface to said biasable transfer member, wherein said biasable transfer member comprises: a) an electrically conductive core for supporting a uniform bias potential thereon; and b) an outer layer provided on said electrically conductive core to control resistivity of said outer layer, wherein said outer layer comprises a fluorinated carbon filled fluoroelastomer and has an electrical resistivity to enable said outer layer to transmit a bias potential from said electrically conductive core to an outer periphery of said outer layer.

Embodiments also include: a method for forming a fluoroelastomer for use as an outer layer of the biasable member above, comprising: a biasable transfer member for use in an electrographic printing apparatus for transferring electrically charged particles from an image support surface to said biasable transfer member, wherein said biasable transfer member comprises: a) an electrically conductive core for supporting a uniform bias potential thereon; and b) an outer layer provided on said electrically conductive core, wherein said outer layer comprises a fluorinated carbon filled fluoroelastomer wherein said fluorinated carbon is of the formula $CF_x$ and x represents the number of fluorine atoms and is from about 0.01 to about 1.5, and wherein said outer layer has an electrical resistivity to enable said outer layer to transmit a bias potential from said electrically conductive core to an outer periphery of said outer layer.

Embodiments further include: a biasable transfer member for use in an electrographic printing apparatus for transferring electrically charged particles from an image support surface to said biasable transfer member, wherein said biasable transfer member comprises: a) an electrically conductive core for supporting a uniform bias potential thereon; b) an intermediate layer provided on said electrically conductive core; and c) an outer layer provided on said intermediate layer, wherein said outer layer comprises a fluorinated carbon filled fluoroelastomer and has an electrical resistivity to enable said outer layer to transmit a bias potential from said electrically conductive core to an outer periphery of said outer layer.

The biasable member system and methods thereof provided herein, the embodiments of which are further described herein, enable control of the desired resistivities, allow for uniform electrical properties including resistivity, more stable mechanical properties such as mechanical strength, durometer, tensile strength, elongation and toughness, have improved insensitivities to environmental and mechanical changes such as changes in temperature, relative humidity, corona exposure, corrosive environment, solvent treatment, cycling to high electric fields and running time, and decrease contamination of other xerographic components such as photoconductors.

DETAILED DESCRIPTION OF THE PRESENT INVENTION

Figure 1:
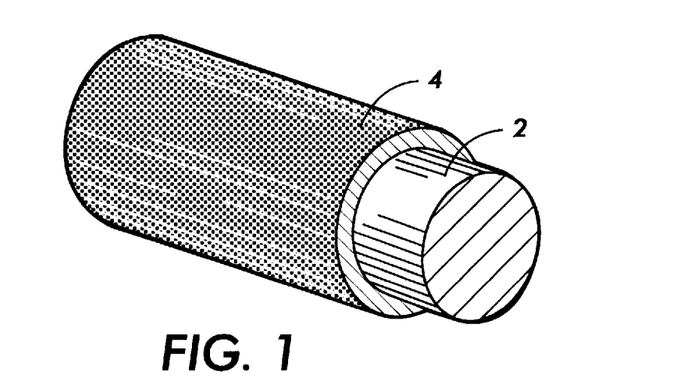
FIG. 1 is a perspective view in partial section showing the construction of a preferred embodiment of a bias transfer roll of the present invention having an electrically conductive fluorinated carbon filled fluoroelastomer layer coated upon a conductive substrate according to the practice of the present invention.

Referring now specifically to FIG. 1, there is shown a cut-away view of a bias system member clearly illustrating the internal construction thereof. The bias system member, in embodiments, is in the form of a roll and, in preferred embodiments, is basically formed upon a solid, rigid cylinder 2 that is fabricated of a conductive metal, such as aluminum, copper, stainless steel, or the like, capable of readily responding to a biasing potential placed thereon. Over core 2 is placed a coating 4 which is an electrically conductive fluorinated carbon filled fluoroelastomer according to the present invention. The coating 4 minimizes ionization of the atmosphere in and about the contact region of the bias transfer member with the photoconductor. It is preferred that the resilient fluorinated carbon fluoroelastomer have a volume resistivity of between about $10^4$ and $10^{13}$ ohm-cm. In accordance with the present invention, the coating of the conductive substrate must be formulated of at least one layer of a fluorinated carbon filled fluoroelastomer. By coating the biasable system member with the conductive elastomer, according to the present invention, the resistivity of the biasable system member can be controlled, and the sensitivity of the resistivity of the biasable system member is also controlled in relationship to changes in relative humidity, temperature, corona exposure, corrosive environment, solvent treatment, cycling to high electric fields and running time. In addition, the surfaces of the present invention, in embodiments, are improved in terms of evenness of coating and mechanical properties.

Figure 2:
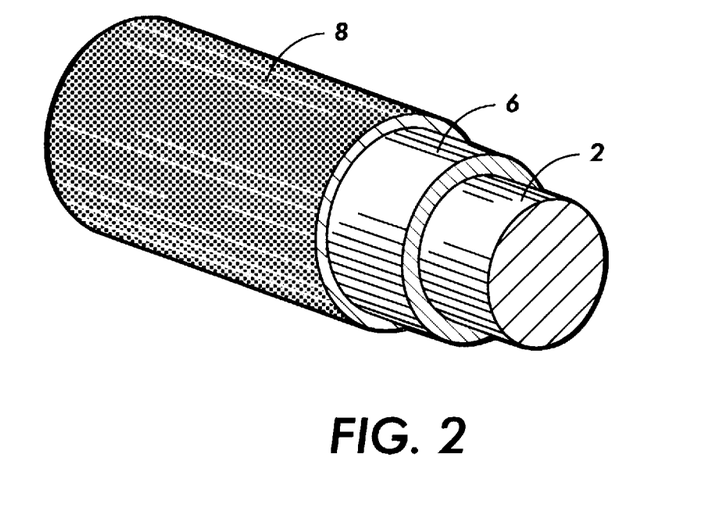
FIG. 2 is a perspective view in partial section showing the construction of a preferred embodiment of a bias transfer roll of the present invention having an intermediate layer in between the conductive substrate and the electrically conductive fluorinated carbon filled fluoroelastomer coating thereon according to the practice of the present invention.

FIG. 2 illustrates a biasable system member of the present invention having an intermediate layer 6 positioned between the conductive substrate 2 and the electrically conductive fluorinated carbon filled fluoroelastomer layer 8 coated thereon according to the practice of the present invention.

The outer surface of the bias system members of the present invention contains fluorinated carbon filled fluoroelastomers. The fluorinated carbon is believed to crosslink with the fluoroelastomer upon curing of the surface coating. The particular resistivity can be chosen and controlled depending, for example, on the amount of fluorinated carbon, the kind of curative, the amount of curative, the amount of fluorine in the fluorinated carbon, and the curing procedures including the specific curing agent, curing time and curing temperature.

The resistivity can be generated not only by selecting the appropriate curing agents, curing time and curing temperature as set forth above, but also by selecting a specific fluorinated carbon, or mixtures of various types of fluorinated carbon. The percentage of fluorine in the fluorinated carbon will also affect the resistivity of the fluoroelastomer when mixed therewith. The fluorinated carbon crosslinked with an elastomer provides unexpectedly superior results by providing a bias transfer member outer surface having a resistivity within the desired range which is virtually unaffected by numerous environmental and mechanical changes.

Fluorinated carbon, sometimes referred to as graphite fluoride or carbon fluoride is a solid material resulting from the fluorination of carbon with elemental fluorine. The number of fluorine atoms per carbon atom may vary depending on the fluorination conditions. The variable fluorine atom to carbon atom stoichiometry of fluorinated carbon permits systematic, uniform variation of its electrical resistivity properties. Controlled and specific resistivity is a highly desired feature for an outer surface of a biasable system member.

Fluorinated carbon, as used herein, is a specific class of compositions which is prepared by the chemical addition of fluorine to one or more of the many forms of solid carbon. In addition, the amount of fluorine can be varied in order to produce a specific, desired resistivity. Fluorocarbons are either aliphatic or aromatic organic compounds wherein one or more fluorine atoms have been attached to one or more carbon atoms to form well defined compounds with a single sharp melting point or boiling point. Fluoropolymers are linked-up single identical molecules which comprise long chains bound together by covalent bonds. Moreover, fluoroelastomers are a specific type of fluoropolymer. Thus, despite some apparent confusion in the art, it is apparent that fluorinated carbon is neither a fluorocarbon nor a fluoropolymer and the term is used in this context herein.

The fluorinated carbon material may be any of the fluorinated carbon materials as described herein. The methods for preparation of fluorinated carbon are well known and documented in the literature, such as in the following U.S. Pat. Nos. 2,786,874; 3,925,492; 3,925,263; 3,872,032 and 4,247,608, the disclosures of which are totally incorporated by reference herein. Essentially, fluorinated carbon is produced by heating a carbon source such as amorphous carbon, coke, charcoal, carbon black or graphite with elemental fluorine at elevated temperatures, such as 150°–600° C. A diluent such as nitrogen is preferably admixed with the fluorine. The nature and properties of the fluorinated carbon vary with the particular carbon source, the conditions of reaction and with the degree of fluorination obtained in the final product. The degree of fluorination in the final product may be varied by changing the process reaction conditions, principally temperature and time. Generally, the higher the temperature and the longer the time, the higher the fluorine content.

Fluorinated carbon of varying carbon sources and varying fluorine contents is commercially available from several sources. Preferred carbon sources are carbon black, crystalline graphite and petroleum coke. One form of fluorinated carbon which is suitable for use in accordance with the invention is polycarbon monofluoride which is usually written in the shorthand manner $CF_x$ with x generally being up to about 1.5, preferably from about 0.01 to about 1.5, and particularly preferred from about 0.04 to about 1.4. $CF_x$ has a lamellar structure composed of layers of fused six carbon rings with fluorine atoms attached to the carbons and lying above and below the plane of the carbon atoms. Preparation of $CF_x$ type fluorinated carbon is described, for example, in above-mentioned U.S. Pat. Nos. 2,786,874 and 3,925,492, the disclosures of which are incorporated by reference herein in their entirety. Generally, formation of this type of fluorinated carbon involves reacting elemental carbon with $F_2$ catalytically. This type of fluorinated carbon can be obtained commercially from many vendors, including Allied Signal, Morristown, N.J.; Central Glass International, Inc., White Plains, N.Y.; Diakin Industries, Inc., New York, N.Y.; and Advanced Research Chemicals, Inc., Catoosa, Okla.

Another form of fluorinated carbon which is suitable for use in accordance with the invention is that which has been postulated by Nobuatsu Watanabe as poly(dicarbon monofluoride) which is usually written in the shorthand manner $(C_2F)_n$. Preparation of $(C_2F)_n$ type fluorinated carbon is described, for example, in above-mentioned U.S. Pat. No. 4,247,608, the disclosure of which is herein incorporated by reference in its entirety, and also in Watanabe et al., "Preparation of Poly(dicarbon monofluoride) from Petroleum Coke", Bull. Chem. Soc. Japan, 55, 3197–3199 (1982).

In addition, preferred fluorinated carbons selected include those described in U.S. Pat. No. 4,524,119 to Luly et al., the subject matter of which is hereby incorporated by reference in its entirety, and those having the tradename ACCUFLUOR®, (ACCUFLUOR® is a registered trademark of Allied Signal, Morristown, N.J.) for example, ACCUFLUOR® 2028, Accufluor® 2065, ACCUFLUOR® 1000, and ACCUFLUOR® 2010. ACCUFLUOR® 2028 and ACCUFLUOR® 2010 have 28 and 11 percent fluorine content, respectively. These fluorinated carbons have the formula $CF_x$ and are formed by the reaction of $C+F_2=CF_x$.

One major advantage of the invention is the capability to be able to vary the fluorine content of the fluorinated carbon to permit systematic uniform variation of the resistivity properties of the biasable member. The preferred fluorine content will depend on the equipment used, equipment settings, desired resistivity, and the specific fluoroelastomer chosen. The fluorine content in the fluorinated carbon is from about 1 to about 70 weight percent based on the weight of fluorinated carbon (carbon content of from about 99 to about 30 weight percent), preferably from about 5 to about 65 (carbon content of from about 95 to about 35 weight percent), and particularly preferred from about 10 to about 30 weight percent (carbon content of from about 90 to about 70 weight percent).

The median particle size of the fluorinated carbon can be less than 1 micron and up to 10 microns, is preferably less than 1 micron, and particularly preferred from about 0.5 to 0.9 micron. The surface area is preferably from about 100 to about 400 m$^2$/g, preferred of from about 110 to about 340, and particularly preferred from about 130 to about 170 m$^2$/g. The density of the fluorinated carbons is preferably from about 1.5 to about 3 g/cc, preferably from about 1.9 to about 2.7 g/cc.

The amount of fluorinated carbon used is from about 1 to about 40, and preferably from about 1.5 to about 35 percent based on the weight of the total solids. This amount is the amount which provides a surface resistivity of the outer layer of from about $10^4$ and $10^{13}$ ohm/sq whether there is an intermediate layer or not. If there is no intermediate layer, a preferred surface resistivity is from about $10^8$ to about $10^{10}$ ohms-cm for the outer resistive layer. If there is present an intermediate layer positioned between the substrate and the outer resistive layer, the outer resistive layer has a resistivity of prefereably from about $10^7$ to about $10^{12}$ ohm-cm. Preferably, an amount of from 1.5 to about 35 percent fluorinated carbon is used to give a resistivity of the outer layer of from about $10^8$ to about $10^{10}$, if there is no intermediate layer, or a resistivity of the outer resistive layer of from about $10^7$ to about $10^{12}$ if there is an intermediate layer positioned between the substrate and the outer resistive layer.

It is preferable to mix different types of fluorinated carbon in order to tune the mechanical and electrical properties. For example, an amount of from about 0 to about 40 percent, and preferably from about 1 to about 35 percent by weight of ACCUFLUOR 2010 can be mixed with an amount of from about 0 to about 40 percent, preferably from about 1 to about 35 percent ACCUFLUOR 2028. Other forms of fluorinated carbon can also be mixed. Another example is an amount of from about 0 to about 40 percent ACCUFLUOR 1000 mixed with an amount of from about 0 to about 40 percent, preferably from about 1 to about 35 percent ACCUFLUOR 2065. All other combinations of mixing the different forms of Accufluor are possible.

Preferred resistivity ranges may vary for transfer systems designed to operate at different transfer sheet throughput speeds and is selected to correspond to the roller surface speed and nip region dimension such that the time necessary to transmit a charge from the conductive core to the external surface of the bias system member is roughly greater than the dwell time for any point on the bias system member in the transfer nip region. Ideally, the external voltage profile of the bias system member provides a field strength below that which is necessary for substantial air ionization in the air gap at the entrance of the nip, and above that required for air ionization in the air gap just beyond the exit of the nip. As a general rule, the magnitude of the electric field increases significantly from the pre-nip entrance toward the post-nip exit while the field within the relaxable layer diminishes. It has been found that a resistivity of the outer layer of between about $10^4$ and $10^{13}$ ohm-cm, preferably from about $10^4$ to about $10^{11}$, and particularly preferred a resistivity of about $10^8$ to about $10^{10}$ ohm-cm is sufficient for this requirement if there is no intermediate layer positioned between the outer resistive layer and the substrate. If, however, there is an intermediate layer positioned between the substrate and the outer resistive layer, the resistivity is preferably from about $10^5$ to about $10^{12}$ ohm-cm and particularly preferred from about $10^7$ to about $10^{11}$ ohm-cm.

Examples of the elastomers for use in the outer surface of the bias system members include the fluoroelastomers. Specifically, suitable fluoroelastomers are those described in detail in U.S. Pat. Nos. 5,166,031, 5,281,506, 5,366,772 and 5,370,931, together with U.S. Pat. Nos. 4,257,699, 5,017,432 and 5,061,965, the disclosures of which are incorporated by reference herein in their entirety. As described therein these fluoroelastomers, particularly from the class of copolymers and terpolymers of vinylidenefluoride hexafluoropropylene and tetrafluoroethylene, are known commercially under various designations as VITON A®, VITON E®, VITON E60C®, VITON E430®, VITON 910®, VITON GH® and VITON GF®. The VITON® designation is a Trademark of E.I. DuPont de Nemours, Inc. Other commercially available materials include FLUOREL 2170®, FLUOREL 2174®, FLUOREL 2176®, FLUOREL 2177® and FLUOREL LVS 76® FLUOREL® being a Trademark of 3M Company. Additional commercially available materials include AFLAS™ a poly(propylene-tetrafluoroethylene) and FLUOREL II® (LII900) a poly(propylene-tetrafluoroethylenevinylidenefluoride) both also available from 3M Company, as well as the Tecnoflons identified as FOR-60KIR®, FOR-LHF®, NM® FOR-THF®, FOR-TFS®, TH®, TN505® available from Montedison Specialty Chemical Company. Other elastomers useful in the present invention include silicone rubbers, ethylene-propylene-diene monomer (hereinafter "EPDM"), epichlorohydrin, styrene-butadiene, fluorosilicone, polyurethane elastomers, and the like. These elastomers, together with known adhesives, can also be included as intermediate layers.

Preferred elastomers useful for the surface of bias system members include elastomers, especially fluoroelastomers, such as fluoroelastomers of vinylidenefluoride based fluoroelastomers, which contain hexafluoropropylene and tetrafluoroethylene as comonomers. Two preferred known fluoroelastomers are (1) a class of copolymers of vinylidenefluoride and hexafluoropropylene known commercially as VITON A® and (2) a class of terpolymers of vinylidenefluoride, hexafluoropropylene and tetrafluoroethylene known commercially as VITON B®. VITON A®, and VITON B®, and other VITON® designations are trademarks of E.I. DuPont de Nemours and Company. Other commercially available materials include FLUOREL TM of 3M Company, VITON GH®, VITON E60C®, VITON B 910®, and VITON E 430®.

In another preferred embodiment, the fluoroelastomer is one having a relatively low quantity of vinylidenefluoride, such as in VITON GF®, available from E.I. DuPont de Nemours, Inc. The VITON GF® has 35 mole percent of vinylidenefluoride, 34 mole percent of hexafluoropropylene and 29 mole percent of tetrafluoroethylene with 2 percent cure site monomer Examples of elastomer suitable for use herein also include elastomers of the above type, along with volume grafted elastomers. Examples of specific volume graft elastomers are disclosed in U.S. Pat. No. 5,166,031; U.S. Pat. No. 5,281,506; U.S. Pat. No. 5,366,772; and U.S. Pat. No. 5,370,931, the disclosures of which are herein incorporated by reference in their entirety. Volume grafted elastomers are a special form of hydrofluoroelastomer and are substantially uniform integral interpenetrating networks of a hybrid composition of a fluoroelastomer and a polyorganosiloxane, the volume graft having been formed by dehydrofluorination of fluoroelastomer by a nucleophilic dehydrofluorinating agent, followed by addition polymerization by the addition of an alkene or alkyne functionally terminated polyorganosiloxane and a polymerization initiator.

Volume graft, in embodiments, refers to a substantially uniform integral interpenetrating network of a hybrid composition, wherein both the structure and the composition of the fluoroelastomer and polyorganosiloxane are substantially uniform when taken through different slices of the bias member. A volume grafted elastomer is a hybrid composition of fluoroelastomer and polyorganosiloxane formed by dehydrofluorination of fluoroelastomer by nucleophilic dehydrofluorinating agent followed by addition polymerization by the addition of alkene or alkyne functionally terminated polyorganosiloxane.

Interpenetrating network, in embodiments, refers to the addition polymerization matrix where the fluoroelastomer and polyorganosiloxane polymer strands are intertwined in one another.

Hybrid composition, in embodiments, refers to a volume grafted composition which is comprised of fluoroelastomer and polyorganosiloxane blocks randomly arranged.

Generally, the volume grafting according to the present invention is performed in two steps, the first involves the dehydrofluorination of the fluoroelastomer preferably using an amine. During this step, hydrofluoric acid is eliminated which generates unsaturation, carbon to carbon double bonds, on the fluoroelastomer. The second step is the free radical peroxide induced addition polymerization of the alkene or alkyne terminated polyorganosiloxane with the carbon to carbon double bonds of the fluoroelastomer. In embodiments, copper oxide can be added to a solution containing the graft copolymer. The dispersion is then provided onto the bias member.

In embodiments, the polyorganosiloxane having functionality according to the present invention has the formula:

where R is an alkyl from about 1 to about 24 carbons, or an alkenyl of from about 2 to about 24 carbons, or a substituted or unsubstituted aryl of from about 4 to about 18 carbons; A is an aryl of from about 6 to about 24 carbons, a substituted or unsubstituted alkene of from about 2 to about 8 carbons, or a substituted or unsubstituted alkyne of from about 2 to about 8 carbons; and n is from about 2 to about 400, and preferably from about 10 to about 200 in embodiments.

In preferred embodiments, R is an alkyl, alkenyl or aryl, wherein the alkyl has from about 1 to about 24 carbons, preferably from about 1 to about 12 carbons; the alkenyl has from about 2 to about 24 carbons, preferably from about 2 to about 12 carbons; and the aryl has from about 6 to about 24 carbon atoms, preferably from about 6 to about 18 carbons. R may be a substituted aryl group, wherein the aryl may be substituted with an amino, hydroxy, mercapto or substituted with an alkyl having for example from about 1 to about 24 carbons and preferably from 1 to about 12 carbons, or substituted with an alkenyl having for example from about 2 to about 24 carbons and preferably from about 2 to about 12 carbons. In a preferred embodiment, R is independently selected from methyl, ethyl, and phenyl. The functional group A can be an alkene or alkyne group having from about 2 to about 8 carbon atoms, preferably from about 2 to about 4 carbons, optionally substituted with an alkyl having for example from about 1 to about 12 carbons, and preferably from about 1 to about 12 carbons, or an aryl group having for example from about 6 to about 24 carbons, and preferably from about 6 to about 18 carbons. Functional group A can also be mono-, di-, or trialkoxysilane having from about 1 to about 10 and preferably from about 1 to about 6 carbons in each alkoxy group, hydroxy, or halogen. Preferred alkoxy groups include methoxy, ethoxy, and the like. Preferred halogens include chlorine, bromine and fluorine. A may also be an alkyne of from about 2 to about 8 carbons, optionally substituted with an alkyl of from about 1 to about 24 carbons or aryl of from about 6 to about 24 carbons. The group n is from about 2 to about 400, and in embodiments from about 2 to about 350, and preferably from about 5 to about 100. Furthermore, in a preferred embodiment n is from about 60 to about 80 to provide a sufficient number of reactive groups to graft onto the fluoroelastomer. In the above formula, typical R groups include methyl, ethyl, propyl, octyl, vinyl, allylic crotnyl, phenyl, naphthyl and phenanthryl, and typical substituted aryl groups are substituted in the ortho, meta and para positions with lower alkyl groups having from about 1 to about 15 carbon atoms. Typical alkene and alkenyl functional groups include vinyl, acrylic, crotonic and acetenyl which may typically be substituted with methyl, propyl, butyl, benzyl, tolyl groups, and the like.

The amount of fluoroelastomer used to provide the surface of the present invention is dependent on the amount necessary to form the desired thickness of the layer or layers of surface material. Specifically, the fluoroelastomer is added in an amount of from about 60 to about 99 percent, preferably about 70 to about 99 percent by weight.

Any known solvent suitable for dissolving a fluoroelastomer may be used in the present invention. Examples of suitable solvents for the present invention include methyl ethyl ketone, methyl isobutyl ketone, diethyl ketone, cyclohexanone, n-butyl acetate, amyl acetate, and the like. The purpose of the solvent is to wet the fluorocarbon. Specifically, the solvent is added in an amount of from about 25 to about 99 percent, preferably from about 70 to about 95 percent.

The dehydrofluorinating agent which attacks the fluoroelastomer generating unsaturation is selected from basic metal oxides such as MgO, CaO, $Ca(OH)_2$ and the like, and strong nucleophilic agents such as primary, secondary and tertiary, aliphatic and aromatic amines, where the aliphatic and aromatic amines have from about 2 to about 15 carbon atoms. Also included are aliphatic and aromatic diamines and triamines having from about 2 to about 15 carbon atoms where the aromatic groups may be benzene, toluene, naphthalene, anthracene, and the like. It is generally preferred for the aromatic diamines and triamines that the aromatic group be substituted in the ortho, meta and para positions. Typical substituents include lower alkyl amino groups such as ethylamino, propylamino and butylamino, with propylamino being preferred. The particularly preferred curing agents are the nucleophilic curing agents such as VITON CURATIVE VC-50® which incorporates an accelerator (such as a quaternary phosphonium salt or salts like VC-20) and a crosslinking agent (bisphenol AF or VC-30); DIAK 1 (hexamethylenediamine carbamate) and DIAK 3 (N,N'-dicinnamylidene-1,6 hexanediamine). VC-50 is preferred due to the more thermally stable product it provides. The dehydrofluorinating agent is added in an amount of from about 1 to about 20 weight percent, and preferably from about 2 to about 10 weight percent.

The substrate for the bias system member, including bias transfer rolls and bias charging rolls, according to the present invention may be of any suitable material. Typically, it takes the form of a cylindrical tube or a solid cylindrical shaft of aluminum, copper, stainless steel or certain plastic materials chosen to maintain rigidity, structural integrity and capable of readily responding to a biasing potential placed thereon. It is preferred to use a solid cylindrical shaft of stainless steel. In preferred embodiment, the diameter of the cylindrical tube is from about 1 to about 15 mm, and the length is from about 10 to about 500 mm, preferably from about 150 to about 400 mm.

The bias system members having thereon the surfaces of the present invention include bias transfer members including bias transfer rolls, films, belts and the like; bias induction members including rolls, films, belts, and the like; and bias development members including rolls, films, belts, and the like.

The substrate houses the bias potential member. The bias is typically controlled by use of a DC potential, and an AC potential is typically used along with the DC controlling potential to aid in charging control. The advantage of using AC lies in the reduction of the surface contamination sensitivity. The AC creates a corona in the pre and post nip regions of the devices so that the charging component related to the charge injection in the nip is less important. The AC bias system is proportional to the process speed. This sometimes limits the application of bias devices to low speed machines. Use of AC in addition to DC increases the cost of the system. Therefore it is desirable to use only a DC. However, use of only DC bias requires materials with an optimum, stable resistivity. Otherwise, use of a single DC bias will result in charging non-uniformity and pre-nip breakdown. Because the present surfaces, in embodiments, allow for optimum and stable resistivities as set forth above, the bias system member of the present invention may only include a DC bias charging system, without the need for an AC bias. In addition, the present invention can be used with electroded field tailoring with an electroded substrate, or with double bias field tailoring without electrodes. These latter two approaches are useful with a stationary film charging system or bias transfer rolls. Also, in embodiments, the present invention may be used in double bias systems, such as electroded and/or non-electroded rolls or film chargers.

Optional intermediate adhesive layers and/or elastomer layers may be applied to achieve desired properties and performance objectives of the present invention. An adhesive intermediate layer may be selected from, for example, epoxy resins and polysiloxanes. Preferred adhesives are proprietary materials such as THIXON 403/404, Union Carbide A-1100, Dow TACTIX 740, Dow TACTIX 741, and Dow TACTIX 742. A particularly preferred curative for the aforementioned adhesives is Dow H41. The bias system member may have an elastomer layer provided on the substrate, and a fluorinated carbon filled fluoroelastomer layer provided on the elastomer layer. The intermediate layer can be an elastomer having a hardness of less than 90 Shore A, preferably from about 5 to about 60 Shore A. The intermediate layer can be from about 0.5 to about 5 mm (millimeters) in thickness and is preferably from 1 to about 4 mm in thickness. The intermediate layer has sufficient resiliency to allow the roll to deform when brought into moving contact with a photoconductor surface and in the case of a transfer roll, to provide an extended contact region in which the toner particles can be transferred between the contact bodies. The intermediate layer should be capable of responding rapidly to the biasing potential to impart electrically the charge potential on the core to the outer surface. The resistivity of the intermediate layer is preferably from about $10^4$ to $10^{11}$ ohm-cm, and particularly preferred is $10^7$ to about $10^{10}$ ohm-cm.

If the intermediate layer is an elastomer layer, there may be provided an adhesive layer between the substrate and the intermediate layer. There may also be an adhesive layer between the intermediate layer and the outer layer. In the absence of an intermediate layer, the fluorinated carbon filled fluoroelastomer layer may be provided directly onto the substrate or may be bonded to the substrate via an adhesive layer. The intermediate layer or layers may contain a conductive filler such as carbon black, fluorinated carbon black, tin oxide, titanium oxide and the like.

The outer layer of the biasable member is preferably prepared by mixing a solvent such as methyl ethyl ketone, methyl isobutyl ketone and the like with the desired type(s) and amount(s) of fluorinated carbon, along with steel shots for mixing. The mixture is stirred to allow the fluorinated carbon to become wet from the solvent (approximately 1 minute). Next, an amount of elastomer, preferably a fluoroelastomer, is added and the contents are mixed (approximately 20–40 minutes, and preferably 30 minutes). A curative and stabilizer (for example, methanol) are then added and mixed again (approximately 15 minutes). The final solid content of the dispersion is from about 1 to about 30 percent, and preferably from about 2 to about 25 percent by weight. The steel shots are filtered, the dispersion collected and then coated onto the substrate. The coated layers are first air-dried (approximately 2–5 hours) and then step heat cured (65° C. for 4 hours, 93° C. for 2 hours, 144° C. for 2 hours, 177° C. for 2 hours, 204° C. for 2 hours and 232° C. for 16 hours).

Curing may be effected for from about 1 hour to about 48 days, preferably from about 1 to about 16 hours at a temperature of from about 25 to about 250° C., and preferably from about 100° to about 235° C.

The outer surface is deposited on the substrate via spinning, dipping, roll coating, spraying such as by multiple spray applications of very thin films, casting, plasma deposition, or by other suitable, known methods. Preferred methods include roll coating, dip coating and spray coating.

The outer surface of the biasable system member can vary depending upon specific applications from about 0.5 to about 5 mm, preferably from about 1 to about 4 mm. If, however, there is included an intermediate layer between the outer surface layer and the substrate, the intermediate layer is from about 0.5 to about 5 mm and preferably from about 1 to about 4 mm thick, and the resistive surface layer is from about 1 to about 500 micrometers, and preferably from about 20 to about 100 micrometers thick. It is preferred that the outer layer of the bias system member of the present invention have a hardness of less than about 90 Shore A durometer, preferably from about 5 to about 60 Shore A. The fluoroelastomer layer of the present invention should have sufficient resiliency to allow the bias transfer member to become slightly deformed when brought into moving contact with an opposing member such as a photoreceptor.

The biasable members herein having outer layers comprising fluorinated carbon filled fluoroelastomers exhibit superior electrical and mechanical properties. The members are designed so as to enable control of electrical properties including control of conductivity in the desired resistivity range. Further, the biasable members herein have decreased sensitivities to changes in temperature, relative humidity, corona exposure, corrosive environments, solvent treatment, cycling to high electric fields, and running time. Moreover, the bias members herein exhibit a decrease in contamination of other xerographic components such as photoconductors.

All the patents and applications referred to herein are hereby specifically, and totally incorporated herein by reference in their entirety in the instant specification.

The following Examples further define and describe embodiments of the present invention. Unless otherwise indicated, all parts and percentages are by weight.

EXAMPLES

Example I

A resistive layer containing 30% by weight of ACCU-FLUOR 2028 in VITON GF was prepared in the following manner. The coating dispersion was prepared by first adding a solvent (200 g of methyl ethyl ketone), steel shots (2300 g) and 19.5 g of ACCUFLUOR 2028 in a small bench top attritor (model 01A). The mixture was stirred for about one minute so that the fluorinated carbon became wet. A polymer binder, VITON GF (45 g) was then added and the resulting mixture was attrited for 30 minutes. A curative package (2.25 g VC-50, 0.9 g Maglite-D and 0.2 g $Ca(OH)_2$) and a stabilizing solvent (10 g methanol) were then introduced and the resulting mixture was further mixed for another 15 minutes. After filtering the steel shot through a wire screen, the dispersion was collected in a polypropylene bottle. The resulting dispersion was then coated onto KAPTON® substrates within 2–4 hours using a Gardner Laboratory coater. The coated layers were air-dried for approximately two hours and then step heat cured in a programmable oven. The heating sequence was as follows: (1) 65° C. for 4 hours, (2) 93° C. for 2 hours, (3) 144° C. for 2 hours, (4) 177° C. for 2 hours, (5) 204° C. for 2 hours and (6) 232° C. for 16 hours. This resulted in a VITON layer containing 30% by weight ACCUFLUOR 2028. The dry thickness of the layers was determined to be ~3 mil (~75 μm).

The surface resistivity of the cured VITON layers was measured by a Xerox Corporation apparatus consisting of a power supply (Trek 601C Coratrol), a Keithy electrometer (model 610B) and a two point conformable guarded electrode probe (15 mm spacing between the two electrodes). The field applied for the measurement was 1500 V/cm and the measured current was converted to surface resistivity based on the geometry of the probe. The surface resistivity of the layer was determined to be ~1×10$^9$ ohm/sq.

The volume resistivity of the layer was determined by the standard AC conductivity technique. The VITON® layer was coated directly onto a stainless steel substrate, in the absence of an intermediate layer. An evaporated aluminum thin film (300 Å) was used as the counter electrode. The volume resistivity was found to be ~1×10$^9$ ohm-cm at an electric field of 1500 V/cm. Surprisingly, the resistivity was found to be insensitive to changes in temperature, relative humidity and applied electric field (up to 2000 V/cm). Furthermore, no hysteresis (memory) effect was seen after the layer was cycled to higher electric fields (>10$^4$ V/cm).

Example II

A number of resistive layers were prepared using various percentages by weight of ACCUFLUOR® 2028 and ACCUFLUOR® 2010 following the procedures described in Example I. These layers were found to exhibit very similar electric properties as the layers in Example 1 when measured following the same procedures. The data is summarized in Table I.

TABLE 1

Resistivity Data of Fluorinated Carbon in Viton GF (field ~ 1500 V/cm)

| Fluorinated Carbon | Loading (% by weight) | Surface Resistivity (ohm/sq) | Volume Resistivity (ohm-cm) |
|---|---|---|---|
| Accufluor 2028 | 35 | 1.7 × 10$^7$ | ~1.6 × 10$^8$ |
| Accufluor 2028 | 25 | 1.0 × 10$^{10}$ | ~6 × 10$^9$ |
| Accufluor 2028 | 20 | 8.9 × 10$^{11}$ | ~5 × 10$^{11}$ |
| Accufluor 2010 | 30 | 8.3 × 10$^4$ | |
| Accufluor 2010 | 10 | 1.9 × 10$^5$ | |
| Accufluor 2010 | 5 | 4.1 × 10$^5$ | |
| Accufluor 2010 | 3.5 | 4.5 × 10$^6$ | |
| Accufluor 2010 | 3 | 1.7 × 10$^8$ | |

Example III

A number of resistive layers were prepared using the dispersing and coating procedure as described in Example I, with the exception that a mixture of various percentages by weight of various types of ACCUFLUOR® were crosslinked to VITON® GF. The compositions of the ACCUFLUOR®/VITON® GF layers and the surface resistivity results are summarized in Table 2.

TABLE 2

| Fillers in Viton GF (%) | Surface Resistivity (ohm/sq) |
|---|---|
| 2% Accufluor 2010<br>15% Accufluor 2028 | 4.5 × 10$^{11}$ |
| 2.5% Accufluor 2010<br>15% Accufluor 2028 | 1.0 × 10$^9$ |
| 3% Accufluor 2010<br>5% Accufluor 2028 | 5.4 × 10$^9$ |
| 3% Accufluor 2010<br>10% Accufluor 2028 | 6.4 × 10$^9$ |
| 3% Accufluor 2010<br>15% Accufluor 2028 | 1.3 × 10$^{10}$ |
| 3.5% Accufluor 2010<br>5% Accufluor 2028 | 2 × 10$^9$ |
| 3.5% Accufluor 2010<br>15% Accufluor 2028 | 7.2 × 10$^9$ |

Example IV

Resistive layers consisting of 25% by weight of ACCUFLUOR® 2028 in VITON® GF were prepared according to the procedures described in Example I. However, instead of performing a post-curing at 232° C. for 16 hours, the post-curing was performed for 9 hours, 26 hours, 50 hours, 90 hours and 150 hours, respectively. The surface resistivity results are shown in Table 3.

TABLE 3

| Post-curing Time | Surface Resistivity (ohm/sq) |
|---|---|
| 9 hours | 5.5 × 10$^{10}$ |
| 26 hours | 8.8 × 10$^9$ |
| 50 hours | 1.8 × 10$^9$ |
| 90 hours | 7.3 × 10$^7$ |
| 150 hours | 7.2 × 10$^6$ |

Example V

Coating dispersions containing different concentrations of ACCUFLUOR® 2010 in VITON® GF were prepared using the attrition procedures given in Example I. These dispersions were then air-sprayed onto KAPTON® substrates. The layers (~2.5 mm) were air-dried and post-cured using the procedure outlined in Example I. The surface resistivity results are summarized in Table 4 below. The percentages are by weight.

TABLE 4

| Accufluor 2010 Loading in Viton GF (%) | Surface Resistivity (ohm/sq) |
|---|---|
| 6% | 1.6 × 10$^{12}$ |
| 7% | 7.0 × 10$^8$ |
| 8% | 8.5 × 10$^7$ |
| 10% | 6.2 × 10$^6$ |
| 20% | 1.1 × 10$^5$ |

Example VI

A coating dispersion was prepared by first adding a solvent (200 g of methyl ethyl ketone), steel shots (2300 g) and 2.4 g of ACCUFLUOR® 2028 in a small bench top attritor (model 01A). The mixture was stirred for about one minute so that the fluorinated carbon became wet from the solvent. A polymer binder, VITON® GF (45 g), was then added and the resulting mixture was attrited for 30 minutes. A curative package (0.68 g DIAK 1 and 0.29 g Maglite Y) and a stabilizing solvent (10 g methanol) were then introduced and the mixture was further mixed for about 15 minutes. After filtering the steel shot through a wire screen, the fluorinated carbon/VITON® GF dispersion was collected in a polypropylene bottle. The dispersion was then coated onto KAPTON® substrates within 2–4 hours using a Gardner laboratory coater. The coated layers were first air-dried for approximately two hours and then heat cured in a programmable oven. The heating sequence was: (1) 65° C. for 4 hours, (2) 93° C. for 2 hours, (3) 144° C. for 2 hours, (4) 177° C. for 2 hours, (5) 204° C. for 2 hours and (6) 232° C. for 16 hours. A resistive layer (~3 mil) consisting of 5% by weight ACCUFLUOR® 2028 in VITON® GF was formed. The surface resistivity of the layer was measured according to procedures in Example I and was found to be ~1×10$^8$ ohm/sq.

Example VII

A resistive layer consisting of 5% by weight ACCUFLUOR® 2028 in VITON® GF was prepared according to the procedures in Example VI, with the exception that 1.36 g of DIAK 1 was used as the curative. The surface resistivity of the layer was measured at 1×10$^5$ ohm/sq.

Example VIII

A coating dispersion was prepared by first adding a solvent (200 g of methyl ethyl ketone), steel shots (2300 g)

and 1.4 g of ACCUFLUOR® 2028 in a small bench top attritor (model 01A). The mixture was stirred for about one minute so that the fluorinated carbon became wet. A polymer binder, VITON GF (45 g), was then added and the resulting mixture was attrited for 30 minutes. A curative package (1.36 g DIAK 3 and 0.2 g Maglite Y) and a stabilizing solvent (10 g methanol) were then introduced and the resulting mixture was further mixed for another 15 minutes. After filtering the steel shot through a wire screen, the fluorinated carbon/VITON GF dispersion was collected in a polypropylene bottle. The dispersion was then coated onto KAPTON substrates within 2–4 hours using a Gardner Laboratory coater. The coated layers were first air-dried for approximately 2 hours and then heat cured in a programmable oven. The heat curing sequence was: (1) 65° C. for 4 hours, (2) 93° C. for 2 hours, (3) 144° C. for 2 hours. (4) 177° C. for 2 hours, (5) 204° C. for 2 hours and (6) 232° C. for 16 hours. A resistive layer (~3 mil) consisting of 3% ACCUFLUOR 2028 in VITON GF was formed. The surface resistivity of the layer was measured at $\sim 8 \times 10^6$ ohm/sq.

Example IX

Resistive layers consisting of 5% ACCUFLUOR® 2028 in VITON® GF were prepared using the dispersion and coating procedures as outlined in Example VI, with the exception that the curing times and the curing temperatures were changed. The surface resistivities of these layers are summarized in Table 5.

TABLE 5

| Curing Temperature (°C.) | Curing time (hours) | Surface Resistivity (ohm/sq) |
| --- | --- | --- |
| 232 | 2 | $3.6 \times 10^8$ |
| 232 | 4.5 | $1.2 \times 10^8$ |
| 232 | 8 | $1.0 \times 10^8$ |
| 195 | 2 | $1.9 \times 10^{10}$ |
| 195 | 4.5 | $6.0 \times 10^9$ |
| 195 | 8 | $7.7 \times 10^9$ |
| 195 | 23 | $3.4 \times 10^9$ |
| 175 | 4.5 | $5.2 \times 10^{10}$ |
| 175 | 23 | $2.0 \times 10^{10}$ |
| 149 | 8 | $5.2 \times 10^{11}$ |
| 149 | 23 | $2.3 \times 10^{11}$ |

Example X

Resistive layers consisting of 3% by weight ACCUFLUOR® 2028 in VITON® GF were prepared using the dispersion and coating procedures as described in Example VIII, with the exception that the curing times and the curing temperatures were changed. The surface resistivities of these layers are summarized in Table 6.

TABLE 6

| Curing Temperature (°C.) | Curing Time (hours) | Surface Resistivity (ohm/sq) |
| --- | --- | --- |
| 235 | 2.5 | $8.1 \times 10^6$ |
| 235 | 6 | $8.0 \times 10^6$ |
| 235 | 8 | $8.0 \times 10^6$ |
| 175 | 2.5 | $6.6 \times 10^8$ |
| 175 | 6 | $4 \times 10^8$ |
| 175 | 24 | $8.8 \times 10^7$ |
| 149 | 2.5 | $1.2 \times 10^{10}$ |
| 149 | 6 | $7.5 \times 10^9$ |
| 149 | 8.5 | $6.1 \times 10^9$ |
| 149 | 24 | $2.5 \times 10^9$ |

Example XI

A bias transfer roll was fabricated by molding a mixture consisting of VITON® GF (90.5%), ACCUFLUOR® 2010 (2.81%), curative VC-50 (4.52%), MgO (1.81%) and Ca(OH)$_2$ (0.40%) onto a steel shaft (8 mm diameter, 331 mm long using the procedures outlined in Example 1). The thickness of the ACCUFLUOR®/VITON® layer was approximately 3 mm. The volume resistivity was measured by the techniques as described in Example 1 and was found to be approximately $10^9$ ohm-cm.

Example XII

A bias transfer roll was fabricated using the outer resistive layers in Examples I to X above with an intermediate layer positioned between the substrate and the resistive layers. The layers were sprayed on a conductive carbon black loaded EPDM intermediate layer (3 mm thick). The volume resistivity of the carbon/EPDM core was $10^6$ ohm-cm and the volume resistivity of the ACCUFLUOR®/VITON® outer layers were from $10^6$ to $10^{12}$ ohm-cm.

Example XIII

A bias transfer roll was fabricated using the process of Example XII above, with the exception that an epichlorohydrin rubber was used as the intermediate layer. The volume resistivity of the rubber layer was measured at $10^8$ ohm-cm. The volume resistivity of the ACCUFLUOR®/VITON® GF outer layers were measured in accordance with Example 1 and found to be $10^6$ to $10^{12}$ ohm-cm.

While the invention has been described in detail with reference to specific and preferred embodiments, it will be appreciated that various modifications and variations will be apparent to the artisan. All such modifications and embodiments as may readily occur to one skilled in the art are intended to be within the scope of the appended claims.

We claim:

1. A biasable transfer member comprising:
   a) an electrically conductive core; and
   b) an outer layer provided on said electrically conductive core comprising a fluorinated carbon-filled fluoroelastomer, wherein said fluorinated carbon has a fluorine content of from about 10 to about 30 weight percent based on the weight of fluorinated carbon, and the carbon content is from about 90 to about 70 weight percent.

2. A member in accordance with claim 1, wherein the fluorinated carbon is present in an amount of from about 1 to about 40 percent by weight based on the amount of total solids.

3. A member in accordance with claim 2, wherein the fluorinated carbon is present in an amount of from about 1.5 to about 35 percent by weight based on the amount of total solids.

4. A member in accordance with claim 1, wherein the fluorinated carbon is of the formula $CF_x$, wherein x represents the number of fluorine atoms and is from about 0.01 to about 1.5.

5. A member in accordance with claim 1, wherein the fluorinated carbon is of the formula $CF_x$, wherein x represents the number of fluorine atoms and is from about 0.04 to about 1.4.

6. A member in accordance with claim 1, wherein said fluorinated carbon is selected from the group consisting of a fluorinated carbon having 28 percent fluorine content and a fluorinated carbon having 11 percent fluorine content.

7. A member in accordance with claim 1, wherein the fluoroelastomer is selected from the group consisting of a) copolymers of vinylidenefluoride hexafluoropropylene and tetrafluoroethylene and b) terpolymers of vinylidenefluoride hexafluoropropylene and tetrafluoroethylene.

8. A member in accordance with claim 1, wherein the fluoroelastomer comprises 35 mole percent of vinylidenefluoride, 34 mole percent of hexafluoropropylene and 29 mole percent of tetrafluoroethylene.

9. A member in accordance with claim 1, wherein the fluoroelastomer is present in an amount of from about 60 to about 99 percent by weight.

10. A member in accordance with claim 1, wherein the resistivity of the outer layer is from about $10^4$ to about $10^{12}$ ohm/sq.

11. A member in accordance with claim 10, wherein the resistivity of the outer layer is from about $10^8$ to about $10^{10}$ ohm/sq.

12. A member in accordance with claim 1, wherein the hardness of the outer layer is from about 5 to about 60 Shore A durometer.

13. A member in accordance with claim 1, wherein the thickness of the outer layer is from about 0.5 to about 5 mm.

14. A member in accordance with claim 1, further including at least one intermediate layer positioned between said electrically conductive core and said outer layer.

15. A member in accordance with claim 14, wherein the intermediate layer has a thickness of from about 1 to about 4 mm, and the outer layer has a thickness of from about 20 to about 100 micrometers.

16. A member in accordance with claim 14, wherein the intermediate layer has a resistance of $10^4$ to $10^{11}$ ohm-cm, and the outer layer has a resistance of from about $10^4$ to about $10^{13}$ ohm-cm.

17. A member in accordance with claim 16, wherein the intermediate layer has a resistance of from about $10^7$ to about $10^{10}$ ohm-cm, and the outer layer has a resistance of from about $10^7$ to about $10^{12}$ ohm-cm.

18. A member in accordance with claim 14, wherein said intermediate layer is an adhesive layer or an elastomer layer.

19. A member in accordance with claim 18, wherein the intermediate layer is an elastomer layer comprising an elastomer selected from the group consisting of silicone rubbers, ethylene-propylene-diene monomer, epichlorohydrin, styrene-butadiene, fluorosilicone, polyurethane elastomers and mixtures thereof.

20. A member in accordance with claim 19, wherein the intermediate elastomer layer further comprises a conductive filler.

21. A member in accordance with claim 20, wherein the conductive filler is selected from the group consisting of carbon black, fluorinated carbon black, tin oxide, titanium oxide and mixtures thereof.

22. A member in accordance with claim 1, wherein the electrically conductive core is biased by a DC bias potential.

23. A member in accordance with claim 22, wherein the electrically conductive core is biased by a DC and an AC bias potential.

24. A member in accordance with claim 1, wherein the electrically conductive core having said outer layer is in the form of an endless belt.

25. A member in accordance with claim 1, wherein the electrically conductive core having said outer layer is in the form of a solid cylindrical shaft comprised of stainless steel.

26. A biasable transfer member comprising:

a) an electrically conductive core;

b) an outer layer provided on said electrically conductive core comprising a fluorinated carbon-filled fluoroelastomer, wherein said fluorinated carbon has a fluorine content of from about 10 to about 30 weight percent based on the weight of fluorinated carbon, and the carbon content is from about 90 to about 70 weight percent; and c) at least one intermediate layer positioned between said electrically conductive core and said outer layer;

wherein the intermediate layer has a resistance of from about $10^7$ to about $10^{10}$ ohm-cm, and the outer layer has a resistance of from about $10^7$ to about $10^{12}$ ohm-cm.

27. A biasable transfer member comprising:

a) an electrically conductive core;

b) an outer layer provided on said electrically conductive core comprising a fluorinated carbon-filled fluoroelastomer, wherein said fluorinated carbon has a fluorine content of from about 10 to about 30 weight percent based on the weight of fluorinated carbon, and the carbon content is from about 90 to about 70 weight percent; and wherein said fluoroelastomer comprises a terpolymer of vinylidene fluoride, hexafluoropropylene and tetrafluoroethylene.

* * * * *